United States Patent [19]

Itou et al.

[11] Patent Number: 4,644,395

[45] Date of Patent: Feb. 17, 1987

[54] X-RAY DIAGNOSTIC APPARATUS

[75] Inventors: Shouichi Itou, Tochigi; Makoto Kaneko; Hiroshi Yasuhara, both of Ootawara, all of Japan

[73] Assignee: Tokyo Shibaura Denki Kabushiki Kaisha, Kawasaki, Japan

[21] Appl. No.: 783,809

[22] Filed: Oct. 4, 1985

Related U.S. Application Data

[63] Continuation of Ser. No. 528,102, Aug. 31, 1983, abandoned.

[30] Foreign Application Priority Data

Sep. 7, 1982 [JP] Japan .................................. 57-156069

[51] Int. Cl.[4] .............................................. H04N 7/01
[52] U.S. Cl. ...................................... 358/111; 378/99; 358/140
[58] Field of Search ....................... 378/99, 100, 901; 358/111, 140, 180, 183; 364/414

[56] References Cited

U.S. PATENT DOCUMENTS 4,125,862 11/1978 Catano ................................. 358/140

FOREIGN PATENT DOCUMENTS 3043703 11/1980 Fed. Rep. of Germany .

Primary Examiner—Craig E. Church
Assistant Examiner—David P. Porta
Attorney, Agent, or Firm—Cushman, Darby & Cushman

[57] ABSTRACT

In an X-ray diagnostic apparatus, there is additionally provided an aspect ratio conversion circuit in a video processor. A video signal derived from an X-ray TV camera for an R/F table system having an aspect ratio e.g., (1:1) is converted into a corresponding digital video signal. The digital video signal is alternately stored in two buffer memories in synchronism with a predetermined clock pulse, which accordingly may change the original aspect ratio (1:1) into a new one, i.e., (3:4). Then the video signal processed under the new aspect ratio is displayed on the monitor which has its own aspect ratio (3:4) different from the original aspect ratio of the TV camera.

3 Claims, 6 Drawing Figures

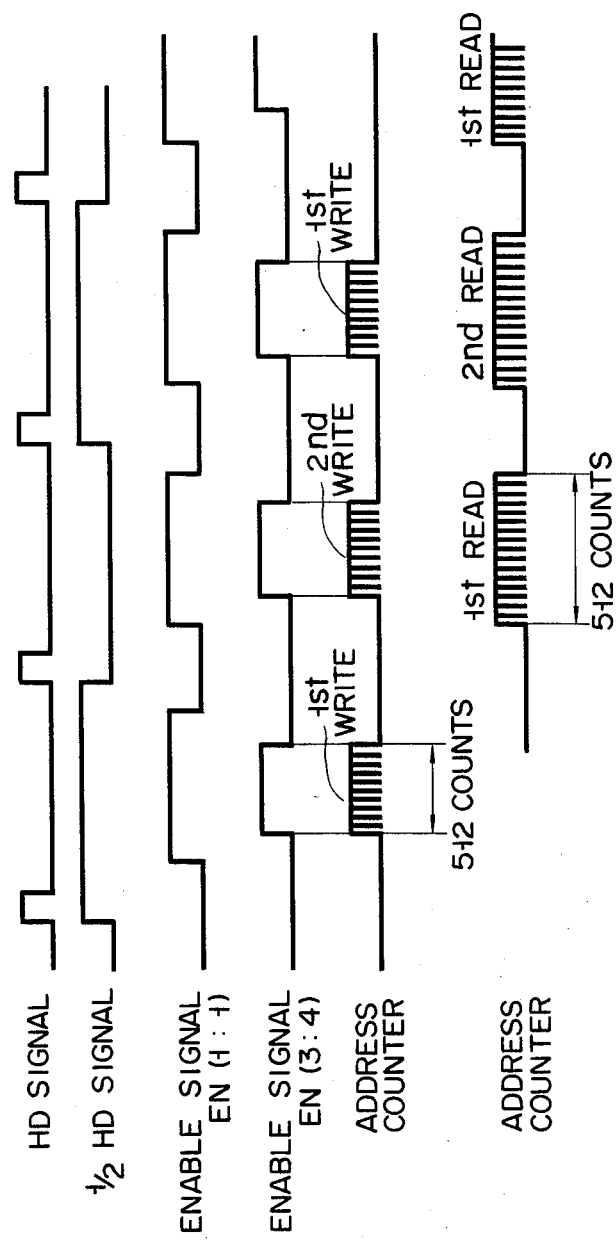

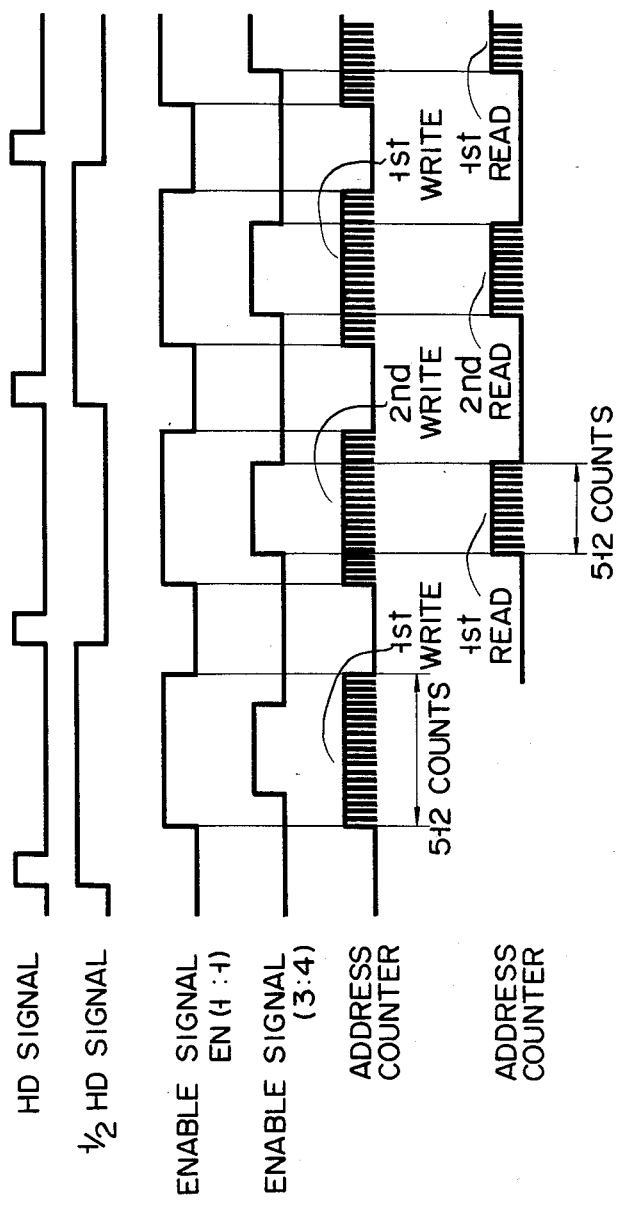

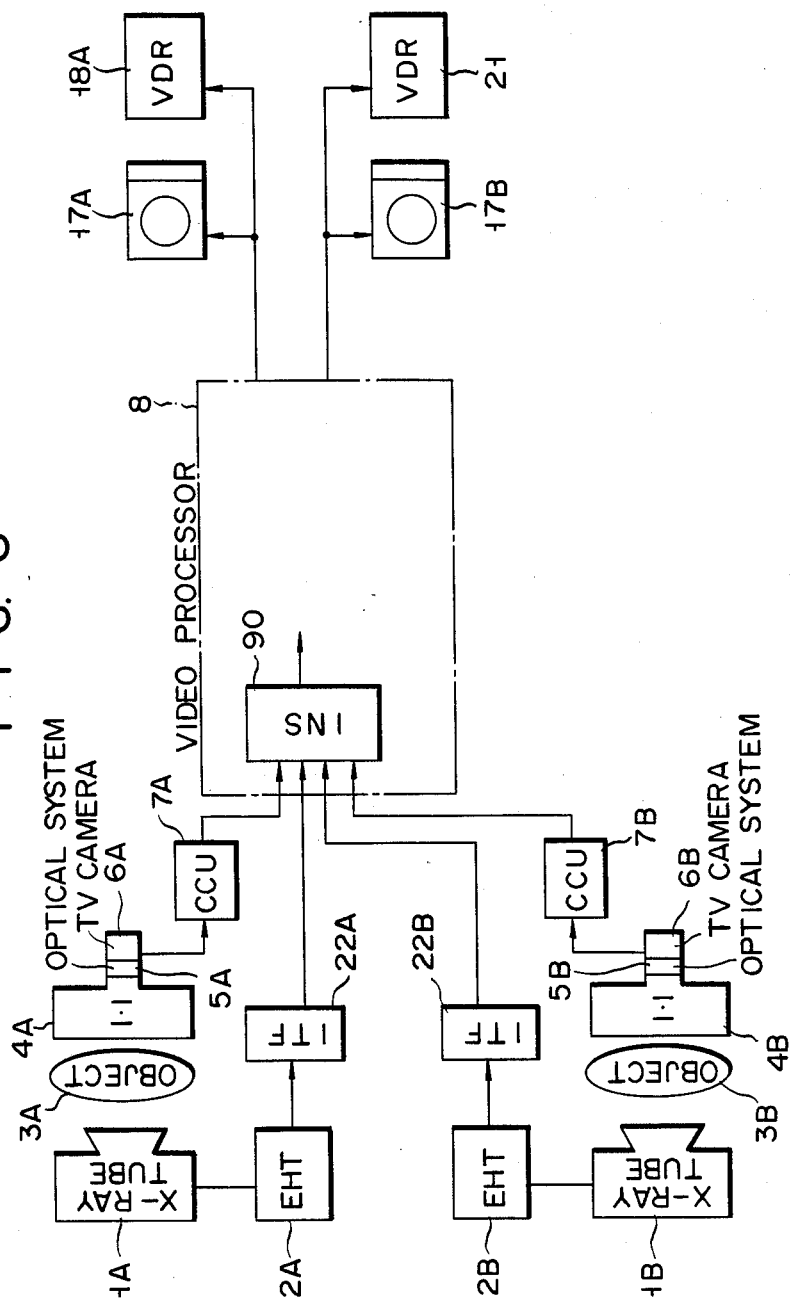

X-RAY DIAGNOSTIC APPARATUS

This is a continuation of application Ser. No. 528,102, filed Aug. 31, 1983, which was abandoned upon the filing hereof.

BACKGROUND OF THE INVENTION

I. Field of the Invention

This invention relates to an X-ray diagnostic apparatus for utilizing X-ray digital radiography, and more particularly to an X-ray diagnostic apparatus by which a deterioration on the resolution of X-ray images taken by X-ray TV cameras can be prevented due to a difference existing in the aspect ratios of the employed TV cameras.

II. Description of the Prior Art

FIG. 1 shows a block diagram of the typical conventional X-ray diagnostic apparatus.

Reference numeral 1 denotes an X-ray tube. Pulsed X-rays are exposed toward an object to be examined from the X-ray tube 1 to which a high voltage generated by an extra high tension generating device 2 is applied. Reference numeral 4 indicates an image intensifier which receives an X-ray image penetrating through the object (to which the X-rays are exposed) and then converts the X-ray image into a corresponding optical image. The optical image output from the image intensifier 4 is projected onto a pick-up tube of a TV camera 6 via an optical system/a diaphragm 5, and thereafter is converted into a video signal in a camera control unit 7 (referred to "CCU"). The video signal is supplied to a video processor 8. This video signal is converted into a digital video signal by an analog/digital converter 11 in such a manner that the former signal derived from CCU 7 is supplied to the converter 11 via an input selector 9 and, if necessary, a log amplifier 10. In a normal condition, the video signal from the input selector 9 is directly supplied to the A/D converter 11 via a switch 40 so as to bypass the log amplifier 10. The video signal which has been converted into a digital form is processed in an arithmetic and logic unit 12 (referred to as "ALU") and then stored in a first frame memory 13. This processing operation is a so-called "first arithmetic operation" in this specification. The first arithmetic operation includes the following processing operation. That is, the mask image signals are summed for e.g., several frames and an average thereof is taken so as to eliminate random noises contained in those signals.

It should be noted that the first frame memory 13 stores the digital video signal which is obtained by converting the X-ray image signal that was taken before injection of the X-ray contrast medium into the object 3 ("mask image memory").

Reference numeral 14 denotes a second frame memory 14 whose memory construction is the same as the first frame memory 13. This second frame memory 14 is to store the digital video signal which is obtained by converting the X-ray image signal that was taken after injection of the X-ray contrast medium into the object 3 ("contrast image memory"). This storing process is completely identical to that of the first frame memory 13. Two sets of the digital signals which are stored in the first and second frame memories 13 and 14 are subtraction-processed in ALU 12 as "a second arithmetic operation" to obtain a subtraction video signal. The subtraction video signal is supplied via a video signal enhancement circuit 15 to a digital/analog converter 16. Then it is converted into an analog video signal in the D/A converter 16 so that the subtraction video signal is displayed on a first monitor 17, or recorded by a video disc recorder 18.

The other D/A converter 19 is provided in the video processor 8 so as to convert such a digital video signal that is not yet subtraction-processed into an analog video signal (mask image signal). The analog video signal from the second D/A converter 19 is supplied to a second monitor 20 so as to display the mask image of the object 3. This analog video signal is also supplied, for recording, to a multiformat camera 21.

The video disc recorder 18 has a memory capacity of e.g., 600 TV frames. The output video signal from the video disc recorder 18 is fed out at arbitrary timing into the input selector 9 of the video processor 8, and may be displayed through the video processor 8 on the first monitor 17.

Reference numeral 22 indicates an interface circuit for X-ray diagnostic apparatus and 23 denotes a system control panel of the video processor 8.

In such a conventional X-ray diagnostic apparatus, two types of X-ray TV cameras are generally employed i.e., one for an R/F table system and the other for an angiographing system. Generally speaking, the aspect ratio of the former camera is 1:1, on the other hand that of the latter camera is 3:4. It is, of course designed for the X-ray diagnostic apparatus employing the TV camera of (1:1) aspect ratio that the video processor can process the video signal derived from the above-mentioned TV camera. Similarly the video processor 8 for, the TV camera of (3:4) aspect ratio is designed to be adapted to such an aspect ratio.

Since originally the X-ray diagnostic apparatus is very expensive, it is desirable that one apparatus can utilize TV cameras for not only the R/F table system, but also the angiographing system. In other words, it is expected that two different aspect ratios of TV cameras can be electrically connected to one diagnostic apparatus.

There are however the following problems when the TV camera for the angiographing system (aspect ratio, 3:4) is directly connected to such an X-ray diagnostic apparatus that can be adapted to the TV camera for the R/F table system (aspect ratio, 1:1). That is, because the scanning length of the pick-up tube becomes practically 4/3 times longer than that in the original aspect ratio during one horizontal scanning period, the horizontal resolution is deteriorated by 3/4 times, compared with the use of a TV camera having the aspect ratio (1:1).

It is an object of the present invention to eliminate such conventional problems.

It is further an object of the present invention to provide an X-ray diagnostic apparatus in which deterioration of the horizontal resolution and the contrast variation caused by a difference in the aspect ratios can be prevented by additionally introducing a simple circuit therein.

SUMMARY OF THE INVENTION

These objects may be accomplished by providing an X-ray diagnostic apparatus comprising:

X-ray radiation means for radiating X-rays toward an object to be examined;

X-ray TV camera means for delivering an analog video signal which is processed under a predetermined aspect ratio by receiving the X-ray images through the object;

video processing means which includes:

an analog/digital converter for converting the analog video signal derived from the X-ray TV camera means into a corresponding digital video signal;

an aspect ratio conversion circuit which has at least a memory circuit and a read-out/write-in control circuit, and is connected to the analog/digital converter, said aspect ratio conversion circuit varying said predetermined aspect ratio of the digital video signal by controlling an analog/digital conversion rate of the analog/digital converter and the read-out/write-in control circuit so as to access the memory circuit; and a digital/analog converter which is connected to the aspect ratio conversion circuit so as to convert the digital video signal derived from the aspect ratio conversion circuit into a corresponding analog signal; and TV monitor means which is connected to the video processing means so as to display the analog video signal derived from the digital/analog converter, the aspect ratio of said analog video signal being fitted to display the X-ray image on the TV monitor means.

In accordance with the present X-ray diagnostic apparatus, there are advantages that deterioration of the resolution and the contrast due to a difference existing in aspect ratios for the TV camera and the monitors can be avoided without redesigning the entire circuit in a complex manner.

BRIEF DESCRIPTION OF THE DRAWINGS

This invention is best understood with reference to the accompanying drawings, in which:

FIG. 4 shows a timing chart of the operations of the aspect conversion circuit in FIG. 3;

FIG. 5 shows a timing chart of the operations of an aspect conversion circuit according to another embodiment; and FIG. 6 shows a block diagram of an X-ray diagnostic apparatus according to another preferred embodiment of the present invention.

DETAILED DESCRIPTION OF THE PREFERRED EMBODIMENTS

Figure 1:
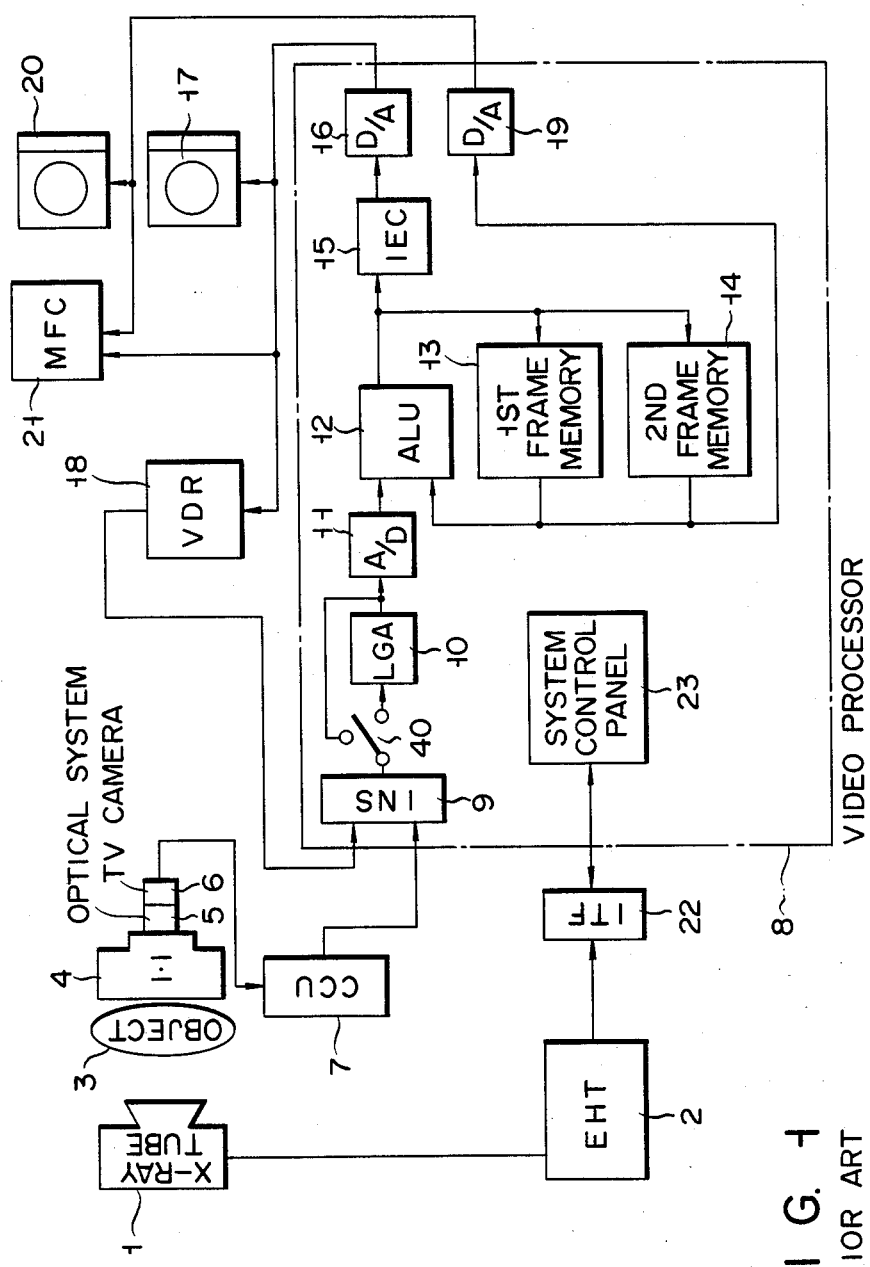
FIG. 1 shows a block diagram of the conventional X-ray diagnostic apparatus.
Figure 2:
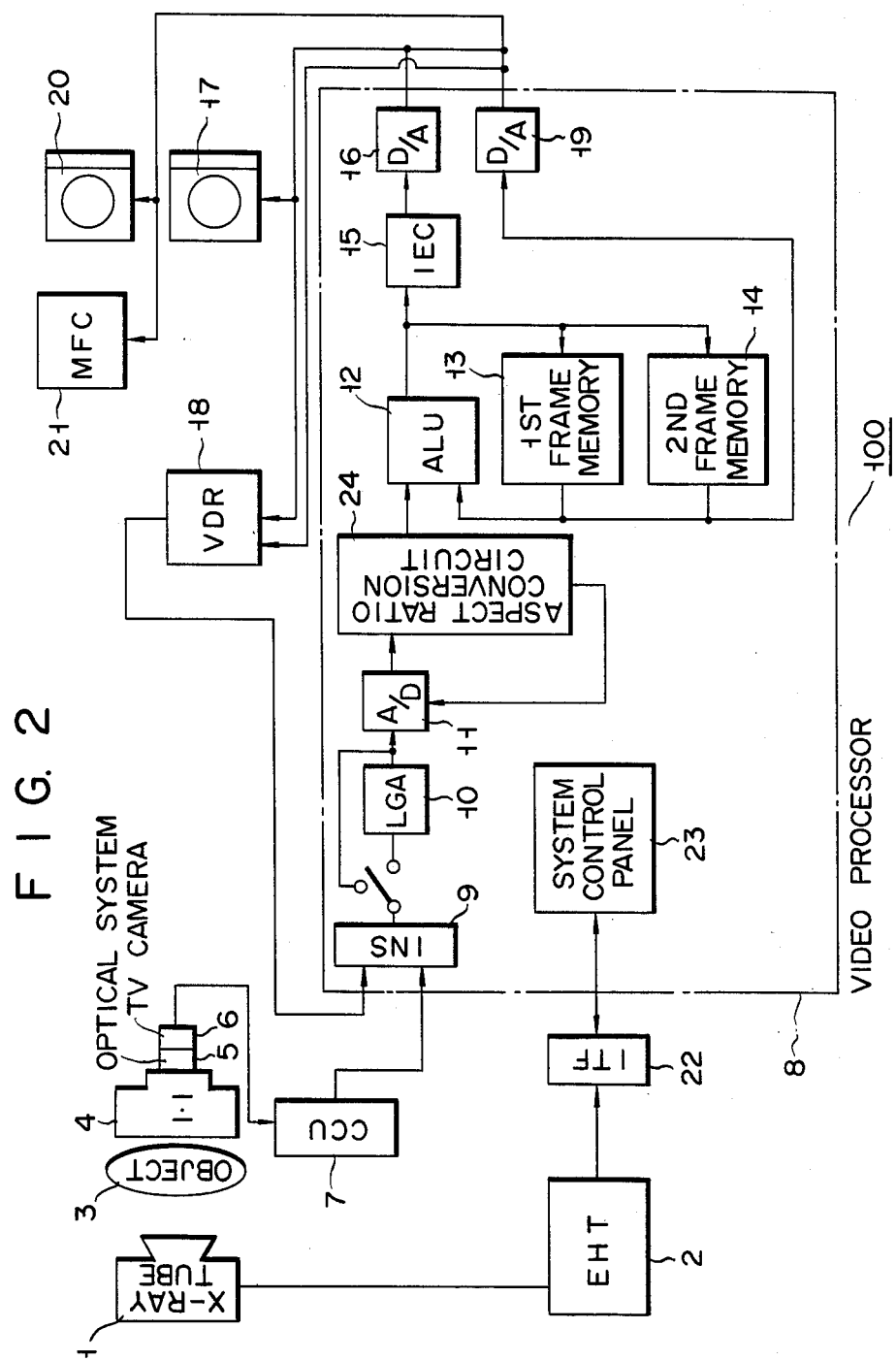
FIG. 2 shows a block diagram of an X-ray diagnostic apparatus according to one preferred embodiment of the present invention.
Figure 3:
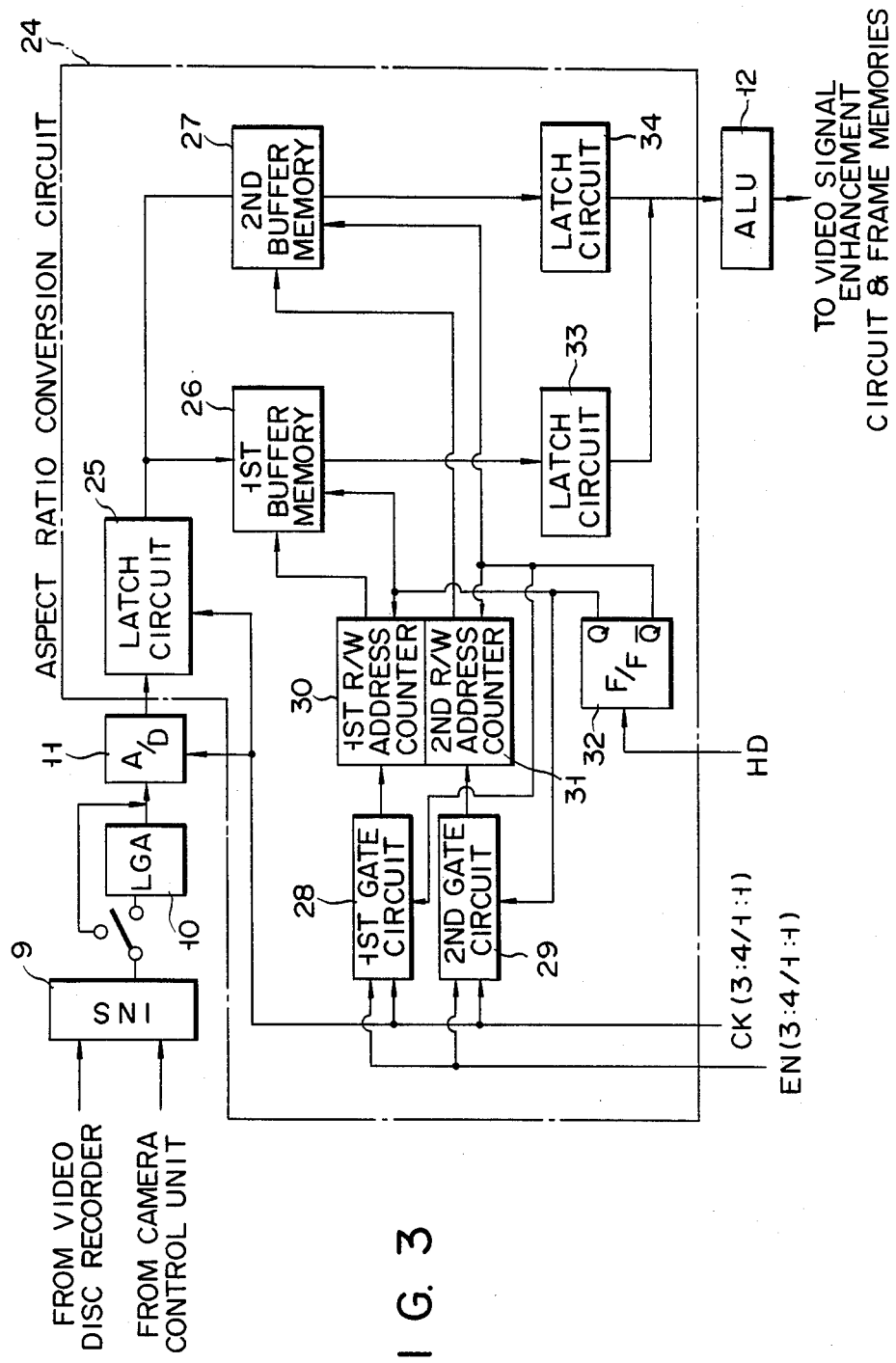
FIG. 3 shows a detailed block diagram of the aspect conversion circuit employed in the X-ray diagnostic apparatus shown in FIG. 2.

One preferred embodiment of an X-ray diagnostic apparatus according to the present invention is disclosed in FIGS. 2 to 4. FIG. 2 shows a block diagram of the entire circuit of the X-ray diagnostic apparatus 100. As seen from the circuit diagram of FIG. 2 there is a difference from the video processors of FIG. 1 in that an aspect ratio conversion circuit 24 is newly introduced in the video processor 8. The remaining circuitry is constructed in common with the circuitry of FIG. 1. Accordingly the following description will be made of the featured circuit, i.e., the aspect ratio conversion circuit 24.

In FIG. 2, reference numeral 24 denotes the aspect ratio conversion circuit which is connected between the A/D converter 11 and ALU 12. The aspect ratio conversion circuit 24 functions as follows: when the aspect ratio of the TV camera 6 employed in the X-ray diagnostic apparatus 100 is chosen to be (3:4), the A/D converting period is shorten by controlling the A/D converter 11 with a high frequency clock pulse CK, and a period for supplying the digital video signal which is derived from the A/D converter 11 to ALU 12 is lengthened; when the TV camera of the aspect ratio (1:1) is connected to the X-ray diagnostic apparatus 100, the A/D converting period of the A/D converter 11 is lengthened by using a low frequency clock pulse CK and the period for supplying the video signal to ALU 12 is the same as the lengthened converting period (details will be given later).

FIG. 3 shows a block diagram of a internal circuit of the aspect ratio conversion circuit 24.

Reference numeral 25 denotes an input latch circuit which may latch the digital video signal derived from the A/D converter 11 under the control of the clock pulse CK which is applied from a clock pulse generator (not shown). Reference numeral 26 indicates a first buffer memory and 27 denotes a second buffer memory each being provided for storing the digital video signal which is latched in and derived from the input latch circuit 25. Reference numerals 28 and 29 indicate gate circuits which have the following functions. That is, when receiving an enable signal EN which may control a write-in time and also a read-out time, and the clock pulse CK and a ½ HD signal which may control a write-in period and also a read-out period, those gate circuits supply the digital video signals from the buffer memories 26, 27 to first and second read/write address counters 30 and 31 respectively. It should be noted that the ½ HD signal is a so-called "½ Horizontal Drive Signal", the phase of which is in synchronism with the horizontal scanning signal of the TV camera 6, and the pulse width of which is different from the same.

The function of the first read/write address counter 30 (referred to as "first R/W address counter") is to send to the first buffer memory 26 a signal for designating read-out and write-in addresses, and that of the second read/write address counter 31 (referred to as "second R/W address counter") is to send to the second buffer memory 27 a signal for designating read-out and write-in addresses. Reference numeral 32 denotes a flip-flop which produces a ½ HD signal by frequency-dividing the HD signal. From one output terminal Q of flip-flop 32, the above-mentioned ½ HD signal is applied to the gate circuit 29, the R/W first address counter 30 and the first buffer memory 26. From the other output terminal $\bar{Q}$, the signal is applied to the gate circuit 28, the second R/W address counter 31 and the second buffer memory 27. Reference numerals 33, 34 denote a first output latch circuit and a second output latch circuit, respectively, which may latch the video signals derived from the first and second buffer memories 26 and 27. Those output signals from the first and second output latch circuits 33 and 34 are an output signal of the aspect ratio conversion circuit 24 which is supplied to ALU 12. It should be noted that when the aspect ratio is selected to be (3:4) in the aspect ratio conversion circuit 24, the periods of the above-described enable signal EN and the clock pulse CK are alternatively chosen to be (3:4) or (1:1).

FIG. 4 shows a timing chart for explaining the operation of the diagnostic apparatus 100 which is originally designed as the aspect ratio of (1:1) when the TV camera having the aspect ratio of (3:4) is connected thereto.

First the analog video signal derived from CCU 7 in FIG. 2 is converted into the given digital video signal by the A/D converter 11 that is controlled by the clock pulse CK for the aspect ratio of (3:4) (referred to as "clock pulse CK (3:4)"). This clock pulse CK (3:4) has 4/3 times higher frequencies than that of a clock pulse CK (1:1), so that the analog video signal is A/D-converted at 4/3 times higher converting speed than in a case of a the use of (3:4) TV camera. Secondly the converted digital video signal is latched by the input latch circuit 25 that is controlled by the clock pulse CK (3:4), and thereafter is delivered to the first and second buffer memories 26 and 27 by the latch circuit 25 respectively. The control operations of write-in/read-out for those buffer memories 26, 27 are effected by the flip-flop 32 into which the ½ HD signal is applied. The detailed timings of the ½ HD signal are shown in FIG. 4. When the ½ HD signal is at "high level", the first address R/W counter 30 operates to write the digital video signal from the input latch circuit 25 into the first buffer memory 26 under the control of the clock pulse CK (3:4). When it is at "low level", the above counter 30 operates to read out the digital video signal from the first buffer memory 26 and to deliver it to the first output latch circuit 33.

On the other hand, when the ½ HD signal is at "low level", the second R/W address counter 31 operates to write the digital video signal into the second buffer memory 27 under the control of the clock pulse CK (3:4). When it is at "high level", the second address R/W counter 31 operates to read out the video signal stored in the buffer memory 27 and deliver it to the second output latch circuit 34 under the control of the clock pulse CK (1:1).

The write-in time is controlled by the enable signal EN (3:4) and the read-out time is by the enable signal EN (1:1). In other words, as the write-in operation is effected at a high speed by the clock pulse CK (3:4), this write-in operation is completed during a "low level" of the enable signal EN (3:4) whose pulse width is ¾ times shorter than that of the enable signal EN (1:1). To the contrary, as the read-out operation is effected at a low speed by the clock pulse CK (1:1), this read-out operation is completed during "high level" of the enable signal EN (1:1) whose pulse width is longer than that of the enable signal EN (3:4).

The operations shown in FIG. 4 will now be summarized. While the high speed write-in operation is carried out to the first buffer memory 26, the read-out operation of the digital video signal which was already written in the second buffer memory 27 is effected at a low speed. Thereafter while the read-out operation is carried out at a low speed for the digital video signal which was written at high speed in the first buffer memory 26, the high speed write-in operation is done for the second buffer memory 27.

The above-described description was to explain the operations of the TV camera 6 for angiographing system having the aspect ratio of (3:4). If the TV camera the R/F table system having (1:1) aspect ratio is employed, the A/D converter 11, the input latch circuit 25, the address R/W counters 30 and 31 are under the control of the clock pulse CK (1:1), and only the enable signal EN (1:1) is utilized, because the diagnostic apparatus 100 is originally designed to accept the aspect ratio of (1:1) as previously explained. In this case, the timing chart of FIG. 4 must be rearranged as follows. The times for the write-in operations by each address R/W counters 30 and 31 should be long in accordance with the enable signal EN (1:1), and also the read-in periods should be long accordingly.

In accordance with one preferred embodiment of the X-ray diagnostic apparatus as shown in FIGS. 2 and 3, the video signals of two TV fields in the X-ray TV camera 6 are separately stored in the buffer memories 26 and 27 every one TV field, and while one buffer memory is effected for the write-in operation, the remaining buffer memory is for the read-out operation. As a result, the high speed write-in operation and the low speed read-out operation are realized. Consequently the X-ray image resolution and the contrast are not deteriorated depending on the aspect ratios of the TV cameras to be employed in the diagnostic apparatus according to the invention, because the converting rate of the A/D converter 11 is variable depending upon the aspect ratios (1:1) or (3:4). That is, there is an advantage to prevent deterioration of the resolution and the contrast by only employing the aspect ratio conversion circuit. Moreover there is no necessity to redesign the video processor for a high speed version or for a complex version.

Another preferred embodiment will now be explained.

As explained in the previous embodiment, the circuit portion following the aspect ratio conversion circuit 24, in the video processor 8, is originally designed to accept the TV camera 6 for R/F table system having the aspect ratio of (1:1). The present invention is not, however, restricted to the above-mentioned aspect ratio. For example the video processor 8 according to the invention can be designed to accept the TV camera for angiographing system having the aspect ratio of (3:4).

FIG. 5 shows a timing chart for explaining such an X-ray diagnostic apparatus such that the TV camera 6 having the aspect ratio of (3:4) can be adapted thereto. In this embodiment, as easily seen from the timing chart, the circuit is operated in an opposite manner compared with the first embodiment. That is, the write-in operation is carried out at a low speed, and the read-out operation is done at a high speed. In this embodiment, the clock pulse CK (1:1) is used as the read-out operation, and the clock pulse CK (3:4) is used as the write-in operation. On the other hand, an enable signal for controlling the write-in time is the enable signal EN (1:1), and an enable signal for controlling the read-out time is the enable signal EN (4:3).

Furthermore, it is understood that when the TV camera having the aspect ratio of (3:4) which is identical to that of this embodiment, the original clock pulse CK (3:4) can be used and only selection is required to introduce the enable signal EN (3:4).

While the invention has been described in terms of certain preferred embodiments and exemplified with respect thereto, those skilled in the art will readily appreciate that various modification, changes, omissions, and substitutions may be made without departing from the spirit of the invention.

For example, in the previous two embodiments, the read-out/write-in operations were not carried out simultaneously. Therefore the first and second buffer memories 26 and 27 were employed. If both operations could be done at the same timing, it is possible to employ only one buffer memory.

It is very obvious based upon the technical scope and spirit of invention that any kinds of the aspect ratios for TV cameras can be adapted to the X-ray diagnostic apparatus according to the invention. Moreover the present invention can be realized under the following condition, that is, while the aspect ratio of the TV camera is originally fitted to the diagnostic apparatus, TV monitors having different aspect ratios from the above-mentioned aspect ratio can be properly connected to the diagnostic apparatus according to the invention. It is also possible for the aspect ratio conversion circuit to be controlled by a micro-computer so as to accept any types of aspect ratios.

As shown in FIG. 6, two X-ray projection devices systems can be connected to the X-ray diagnostic apparatus according to the invention so that the contradiction observation may be realized on the X-ray images taken by the above two projection systems. In this case, although it is necessary to provide two sets of the following devices; X-ray tubes and collimators 1A (1B), extra high tension generating devices 2A (2B), objects to be examined 3A (3B), image intensifiers 4A (4B), optical systems and diaphragms 5A (5B), TV cameras 6A (6B), camera control units 7A (7B) and interface circuits for X-ray diagnostic apparatus 22A (22B), only one video processor 8 is available by applying both output signals from those two systems thereto, so that each of the X-ray images are displayed on the monitors 17A (17B), and recorded by the video disc recorders 18A (18B) respectively.

Operation of the systems shown in FIG. 6 will now be explained. It is assumed that the aspect ratio of the first TV camera 6A is chosen to be (3:4) and that of the second TV camera 6B is chosen to be (1:1). Output signals derived from each of the TV cameras are selectively applied through the input selector 90 to the video processor 8. When the video signal processed under the aspect ratio of (3:4) is input into the video processor 8, the A/D converter 11 is operated with a high frequency clock pulse CK (3:4), and the thus converted video signal is applied to the aspect ratio conversion circuit 24 and then to ALU 12. The digital video signal processed in ALU 12 is then converted into the corresponding analog signal. Subsequently the analog signal is read out under the control of the low frequency clock pulse CK (1:1) so as to be displayed on the given monitor.

On the other hand, when the video signal processed under the aspect ratio of (1:1) from the TV camera is applied to the video processor 8, the A/D converter 11 is operated with a low frequency clock pulse CK (1:1), and the thus converted video signal is further processed in the aspect ratio conversion circuit 24 and ALU 12 under the control of the clock pulse CK (1:1) so as to be displayed on the monitor.

As explained hereinbefore, there are additional features of the invention, for example employing the TV cameras having a plurality of the aspect ratios different from each other into one X-ray diagnostic apparatus. That is, it is not necessary for the monitors or the multi-format cameras to select the aspect ratios which are determined in accordance with the TV cameras used in the apparatus. Moreover since one aspect ratio e.g., (1:1) can be introduced as a common aspect ratio, simplification for the entire system and reduction of the manufacturing cost can be realized.

What is claimed is:

1. An X-ray diagnostic apparatus comprising:
    X-ray radiation means for irradiating X-rays toward an object under examination to produce X-ray images;
    X-ray TV camera means for producing, in response to the X-ray images, analog video signals processed under a predetermined aspect ratio;
    video processing means including:
        an analog/digital converter for converting the analog video signals into corresponding digital video data;
        arithmetic means including an arithmetic logic unit and a frame memory for processing the digital video data under the control of a clock signal having a predetermined frequency, and for storing the processed video data in the frame memory; and
    an aspect ratio conversion circuit, including:
        at least a memory circuit;
        a write-in control circuit for varying the write-in rate of the memory circuit, depending upon the predetermined aspect ratio of said X-ray TV camera means; and
        a read-out control circuit for varying the read-out rate of the memory circuit under the control of said clock signal, said aspect ratio conversion circuit varying said predetermined aspect ratio of the digital video data by controlling the analog/digital conversion rate of the analog/digital converter and the read-out/write-in rates of the read-out/write-in control circuits so as to access the memory circuit;
    a digital/analog converter connected to the frame memory, for converting the digital video data signal derived therefrom into corresponding analog signals; and
    TV monitor means connected to the digital/analog converter for displaying X-ray images derived from the digital/analog converter, the aspect ratio of said analog video signal being fitted to display the X-ray images on the TV monitor means.

2. An X-ray diagnostic apparatus as claimed in claim 1, said aspect ratio conversion circuit further including a first buffer memory and a second buffer memory connected in parallel, said first buffer memory and said second buffer memory alternately storing and outputting the digital video signal from the analog/digital converter by controlling the read-out/write-in control circuit so as to vary said predetermined aspect ratio of the digital video signal.

3. An X-ray diagnostic apparatus as claimed in claim 2, said aspect ratio conversion circuit further including:
    an input latch circuit connected between said analog/digital converter and said first and second buffer memories;
    first and second output latch circuits connected to said first and second buffer memories so as to latch said video signals whose aspect ratios have been varied; and
    first and second read/write address counters as said read-out/write-in control circuit.

* * * * *